H. A. LORD.
COMBINED AIR MOTOR AND COMPRESSOR FOR STARTING INTERNAL COMBUSTION ENGINES.
APPLICATION FILED MAY 23, 1912.
1,080,289.
Patented Dec. 2, 1913.
3 SHEETS—SHEET 1.
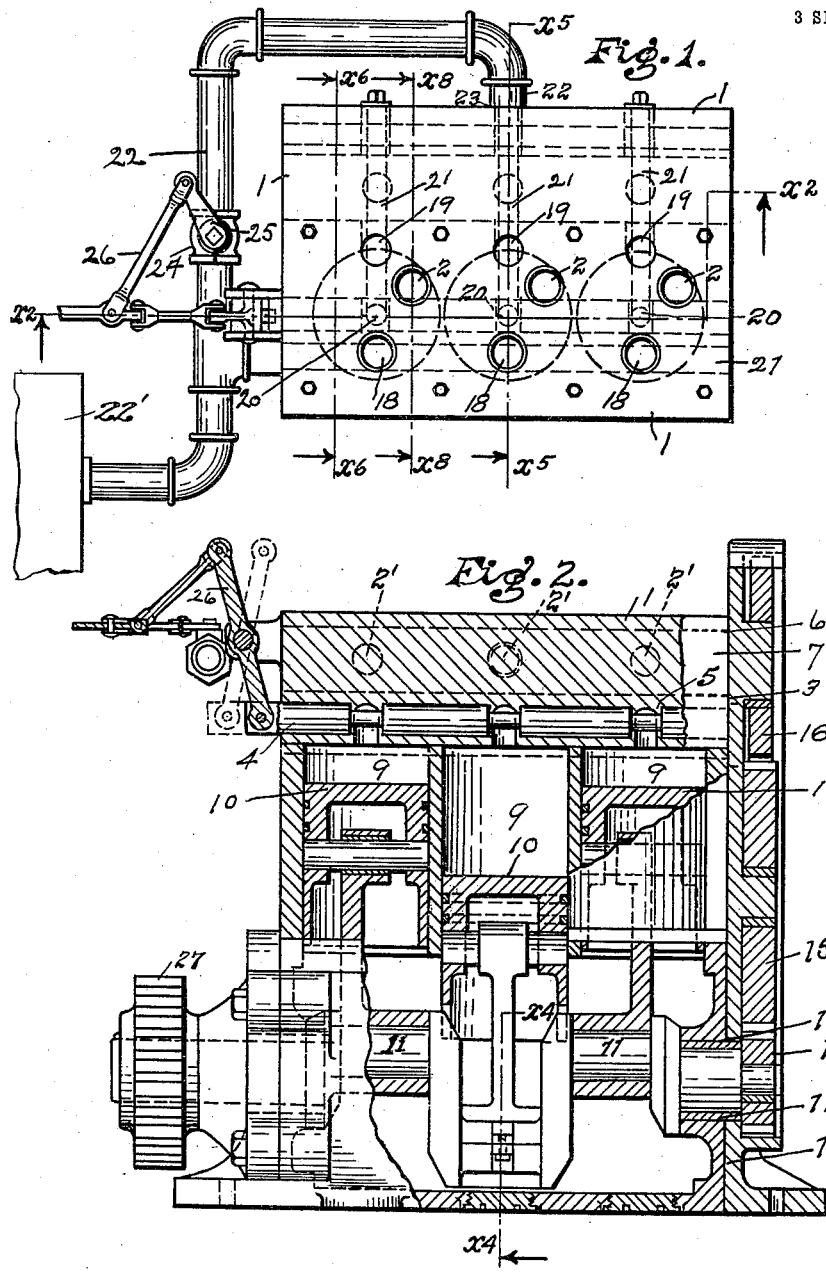
Witnesses:
Inventor:
Harry A. Lord;
By his Attorney.

H. A. LORD.
COMBINED AIR MOTOR AND COMPRESSOR FOR STARTING INTERNAL COMBUSTION ENGINES.
APPLICATION FILED MAY 23, 1912.

1,080,289.

Patented Dec. 2, 1913.

3 SHEETS—SHEET 2.

Witnesses:
W. F. Seemann
J. E. Bookstaver

Inventor:
Harry A. Lord;
By
his Attorney.

H. A. LORD.
COMBINED AIR MOTOR AND COMPRESSOR FOR STARTING INTERNAL COMBUSTION ENGINES.
APPLICATION FILED MAY 23, 1912.
1,080,289.
Patented Dec. 2, 1913.
3 SHEETS—SHEET 3.
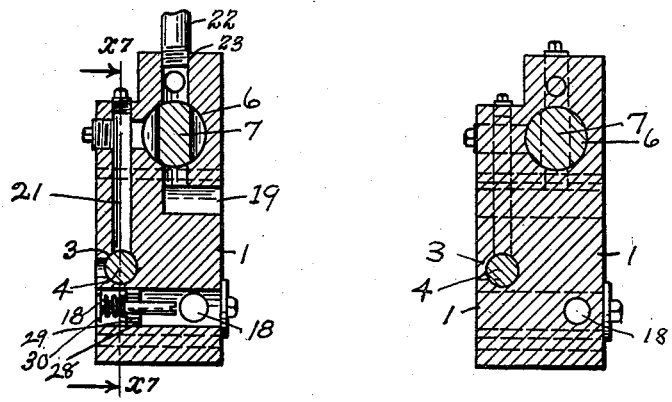
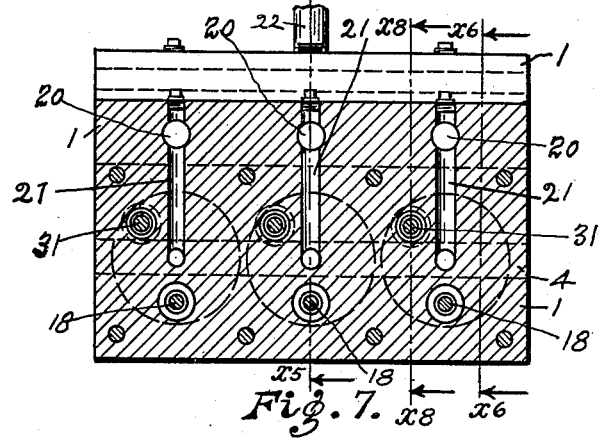
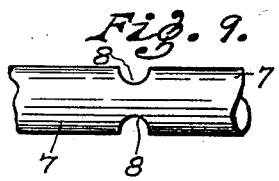
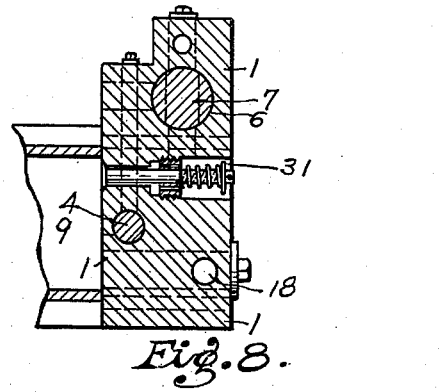
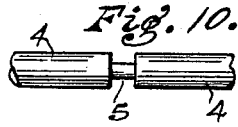
Witnesses:
W. F. Seemann
J. E. Bookstaver
Inventor:
Harry A. Lord;
By Luther L. Mack
his Attorney.
COLUMBIA PLANOGRAPH CO., WASHINGTON, D. C.

UNITED STATES PATENT OFFICE.

HARRY A. LORD, OF SOUTH PASADENA, CALIFORNIA.

COMBINED AIR MOTOR AND COMPRESSOR FOR STARTING INTERNAL-COMBUSTION ENGINES.

1,080,289.

Specification of Letters Patent.

Patented Dec. 2, 1913.

Application filed May 23, 1912. Serial No. 700,347.

*To all whom it may concern:*

Be it known that I, HARRY A. LORD, a citizen of the United States, residing at South Pasadena, in the county of Los Angeles and State of California, have invented a new and useful Combined Air Motor and Compressor for Starting Internal-Combustion Engines, of which the following is a specification.

My invention relates to improvements in combined air motors and compressors for starting internal combustion engines, and the object of my invention is to provide a combined air motor and compressor to be operated from the seat of an automobile to compress air and start the engine. I attain this object by means of the mechanism illustrated in the accompanying drawings, in which—

Figure 3:
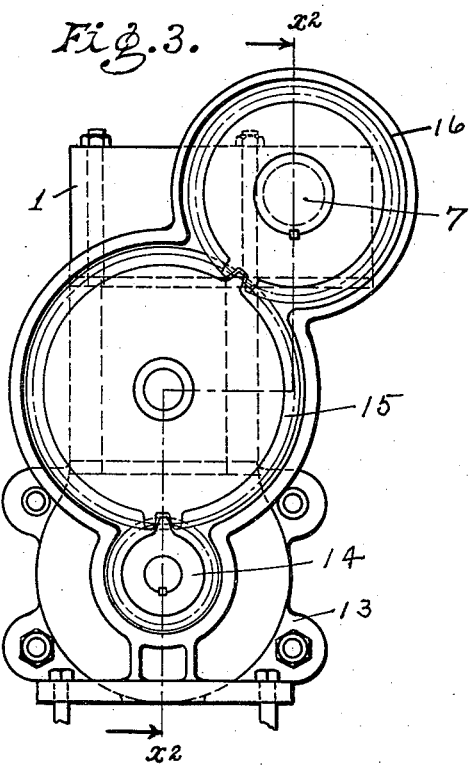
Figure 4:
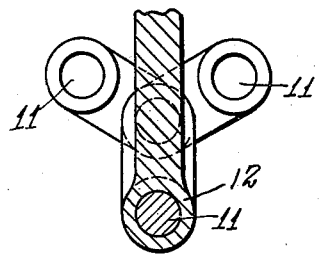

Figure 1— is a plan view of the head of the compressor. Fig. 2— is a sectional elevation of the same on the line $X^2$—$X^2$, Fig. 1. Fig. 3— is an end elevation showing the gears. Fig. 4— is a sectional view on the line $X^4$—$X^4$, Fig. 2. Fig. 5— is a sectional view on the line $X^5$—$X^5$, Fig. 1. Fig. 6— is a sectional view on the line $X^6$—$X^6$ Fig. 7. Fig. 7— is a view in horizontal cross section of the compressor. Fig. 8— is a sectional view on the line $X^7$—$X^7$ Fig. 1. Fig. 9— is a plan view of the rotary valve. Fig. 10— is a perspective view of the piston cut off.

The head 1 has bored in it the atmospheric air inlets 2, 2, 2, the tank inlets 2′, and the piston way 3 in which is the piston valve 4 having formed in it the recesses 5. The rotary valve 6 is revolubly seated in the valve way 7 and has the recesses 8 formed in it. Below the head 1 are the three cylinders 9, 9, 9, in which are the pistons 10, 10, 10, attached to the crank shaft 11 which is journaled in the bearings 12 in the shaft-casing 13. The gear 14 on the shaft is adapted to engage the gear 15 on the casing, which in turn engages the gear 16 on the end of the rotary valve 6.

The cylinders 9 are connected with the atmospheric inlets 2 and with the exhaust ports 19, which are connected by the piston valve 4 and the rotary valve 7 when in certain positions. Another air passage, 21, is connected with the cylinder at the tank outlet 18 and with the tank conduit 22, one end of which is attached to the air tank 22′ and the other to the motor air inlet 23. In this conduit, between its two junctions with the cylinder head, is the cut off valve 24 to which is attached the lever 25. A lever 26 is fulcrumed to the head 1 and one end of it is pivoted to the piston valve 4. This lever and the valve lever 25 are connected by a bell crank fulcrum to the automobile, not shown, by which both may be operated simultaneously to open the ports between the cylinders and the tank conduit and to push the piston valve inward, or vice versa.

The gear 27 is keyed onto the shaft 11, and by it connection may be made with the engine (not shown).

In Fig. 5 is shown the passage 21 between the cylinders and the piston valve 4. Passing the piston valve the passage runs at right angles until it reaches the rotary valve way 6 into which it turns at right angles to its course. From the valve way 6 it connects with two outlets, 23 to the tank conduit 22 and the exhaust outlet 19. The discharge valve 18 has the spring held piston 28 in the valve way provided with the perforations 29, and the spring 30 between the piston and the valve. The intake suction valve 31 Fig. 8 operates similarly to the discharge valve but to draw atmospheric air into the cylinders. In the operation of the machine as an air motor, air is introduced from the tank through the supply pipe or conduit 22 to the motor. The piston valve 4 is set to register its recesses with the ports in the head of the cylinder. The rotary valve is so set that it will start from any position in which it may have been stopped. In changing from motor to compressor, the piston valve is operated longitudinally, until the ports of the cylinder are closed, and at the same instant the shut off valve 24 to the supply line is also closed and the motor takes up the load as a compressor, the air entering through the longitudinal ports, and through the conduit to the tank.

In the operation of this machine as a motor the automatic intake and discharge valves in the cylinder do not conflict in any manner but are entirely automatic in their operation nor do they conflict in any manner when the machine is running as a motor.

In the operation of the machine as a compressor, the piston valve is shifted longitudinally until all ingress and egress of air to a cylinder is stopped. The rotary valve then rotates in a vacuum as all air is withheld by the shut off valve 24 in tank line. Suction of the cylinder pistons in down strokes takes in a charge of air and the discharge valve stores the charge in the storage tank provided for that purpose. By using this construction, only one pipe line is necessary, that from cylinder heads to the tank.

What I claim as my invention and desire Letters Patent for, is—

1. In an air compressor, in combination with a compressing cylinder and a valve way connected therewith, a one piece piston valve slidable in said way, a plurality of recesses in said piston and extending entirely around it, said recesses adapted to register with the ports of said cylinder for the admission or emission of air, and means to operate said piston, a compressed air tank, a conduit from said tank leading to said cylinder, inlet and outlet connections from said cylinder to said conduit, a valve in said conduit, and coöperating means between said conduit valve and said piston valve whereby they may be simultaneously operated.

2. In an air compressor and motor, in combination with a compression cylinder, a rotary valve, a piston valve, and an air conduit between said cylinder and compressed air tank, a valve in the air conduit, a lever on the valve, a lever on the piston valve, and connecting means between the two levers by which the valve may be closed and the piston valve opened or vice versa, simultaneously.

3. A combined air motor and compressor comprising a plurality of compression cylinders, pistons in the cylinders, a crank shaft casing, a crank shaft journaled in the casing and attached to the pistons, a head on the cylinders, inlet ports in the cylinder heads, outlet ports in the cylinder heads, ways in the head connecting with the ports, a recessed piston in one of the ways, a recessed rotary valve in one of the ways, a gear on the rotary valve, a gear on the casing and engaging the first mentioned gear, a gear on the crank shaft adapted to engage the gear on the casing, a lever on the piston valve, an air tank, a conduit from the air tank to the inlet and discharge ports of the cylinders, a valve in the conduit, a lever on the valve, a connecting rod attached to the conduit, valve lever and the piston lever and adapted to operate both simultaneously, and means to connect the crank shaft of the cylinders with an engine, as specified.

4. In an air motor and compressor, in combination with compressor cylinders, pistons in the cylinders, a crank shaft attached to the pistons, gear means to connect the shaft with an engine and gear means to connect the shaft with an idler gear; a cylinder head on the cylinders, longitudinal valve ways in the head, a slidable piston valve in one of the ways, a rotary valve in the other way, air intake suction valves connecting the cylinders with atmospheric air, discharge valves adapted to connect the cylinders with a tank conduit to a storage tank, and means to connect the same operatably with an automobile and to its mechanism.

5. A combined air motor and compressor comprising a plurality of compression cylinders, pistons in the cylinders, a crank shaft casing, a crank shaft journaled in the casing and attached to the pistons, a head on the cylinders, inlet ports in the cylinder head, outlet ports in the cylinder head, ways in the head connecting with the ports, a recessed piston in one of the ways, a gear train between the crank shaft and the rotary valve, the said gear being so speeded as to rotate the said valve in a ratio of 1 to 2 of the crank shaft and adapted to bring the recesses of the rotary valve into register with the cylinder ports twice in each revolution to cause admission and emission of air alternately through the same ports, means to supply atmospheric air to said cylinders, means to supply compressed air to said cylinders, and means to control the functions of said motor and compressor from the driver's seat of an automobile.

HARRY A. LORD.

Witnesses:
LUTHER L. MACK,
M. E. KINNEY.

Copies of this patent may be obtained for five cents each, by addressing the "Commissioner of Patents, Washington, D. C."